US012792947B2

(12) United States Patent
Salathe et al.

(10) Patent No.: US 12,792,947 B2
(45) Date of Patent: Nov. 10, 2026

(54) DISCRIMINATOR, MULTI-QUDIT MULTI-STATE DISCRIMINATOR, AND METHOD

(71) Applicant: Rohde & Schwarz GmbH & Co. KG, Munich (DE)

(72) Inventors: Yves Salathe, Zürich (CH); Michael Casty, Frauenheld (CH); Tobias Thiele, Zürich (CH); Anthony Vanherrewege, Zürich (CH)

(73) Assignee: ROHDE & SCHWARZ GMBH & CO KG, Munich (DE)

( * ) Notice: Subject to any disclaimer, the term of this patent is extended or adjusted under 35 U.S.C. 154(b) by 637 days.

(21) Appl. No.: 18/355,181

(22) Filed: Jul. 19, 2023

(65) Prior Publication Data

US 2024/0046135 A1 Feb. 8, 2024

(30) Foreign Application Priority Data

Aug. 2, 2022 (EP) .................................... 22188257

(51) Int. Cl.
*G06N 10/40* (2022.01)

(52) U.S. Cl.
CPC .................................... *G06N 10/40* (2022.01)

(58) Field of Classification Search
CPC ........ G06N 10/40; G06N 20/10; G06N 10/20; G06F 18/24
See application file for complete search history.

(56) References Cited

U.S. PATENT DOCUMENTS 10,650,322 B1 5/2020 Temme et al.
2019/0050681 A1* 2/2019 Tate ........................ G06V 10/82
2020/0175675 A1* 6/2020 Ogino ..................... G06T 12/30

OTHER PUBLICATIONS

European Patent Office, Extended European Search Report for Application 22188257.4-1203 dated Jan. 23, 2023.
Navarathna Rohit et al., "Neural networks for on-th-fly single-shot state classification," Applied Physics Letters, American Institute of Physics, vol. 119, No. 11, Dated: Sep. 13, 2021, pp. 1-4.
(Continued)

*Primary Examiner* — Masud K Khan
(74) *Attorney, Agent, or Firm* — Patterson + Sheridan, LLP; Carleton S. Clauss

(57) ABSTRACT

The present disclosure provides a discriminator, comprising a signal interface configured to receive an input signal that is read out from a quantum qudit comprising a number d of states, a multi-state discriminator comprising a number of weighted integration units, wherein the number of weighted integration units is equal to (d−1), a one-vs-one classifier that is coupled to the weighted integration units, and a number of pairwise difference units that in addition couple the one-vs-one classifier indirectly with the weighted integration units, wherein the number of pairwise difference units is (d−1)*(d−2)/2, wherein the one-vs-one classifier is configured to determine a state of the quantum qudit based on the output of the weighted integration units and the pairwise difference units. The present disclosure further provides a multi-qudit multi-state discriminator and a respective method.

18 Claims, 7 Drawing Sheets

(56) References Cited

OTHER PUBLICATIONS

Mats O Tholen et al., "Measurement and control of a superconducting quantum processor with a fully-integrated radio-frequency system on a chip," ARXIV.org, Dated: Jun. 1, 2022.
Zi-Feng Chen et al., "Anti-crosstalk high-fidelity state discrimination for superconducting qubits," ARXIV.org, Dated: Mar. 16, 2021, pp. 1-4.

* cited by examiner

DISCRIMINATOR, MULTI-QUDIT MULTI-STATE DISCRIMINATOR, AND METHOD

TECHNICAL FIELD

The disclosure relates to a discriminator, a multi-qudit multi-state discriminator and a respective method.

BACKGROUND

Although applicable to any type of qudit, the present disclosure will mainly be described in conjunction with superconducting qudits.

The qubit or quantum bit is a basic unit of information of quantum information technology. If more than two energy levels or states are used, the general term qudit may be used, where the letter "d" indicates that more than two energy levels or states are relevant. Qubits (d=2), qutrits (d=3) and ququads (d=4) are commonly used names.

When operating quantum computers, distinguishing the different states of qudits fast and reliably is an essential task.

Accordingly, there is a need for providing a fast, real-time and reliable read-out of qudit states in quantum computers.

SUMMARY

The above stated problem is solved by the features of the independent claims. It is understood, that independent claims of a claim category may be formed in analogy to the dependent claims of another claim category.

Accordingly, it is provided:

A discriminator, comprising a signal interface configured to receive an input signal that is read out from at least one quantum qudit that comprises a number d of states, a multi-state discriminator comprising a number of weighted integration units, wherein the number of weighted integration units is equal to (d−1), a one-vs-one classifier that is coupled to the weighted integration units to discriminate the specific qudit state out of d states, and a number of (d−1)*(d−2)/2 pairwise difference units that in addition couple the one-vs-one classifier indirectly with the output of the weighted integration units, wherein the number of pairwise difference units is (d−1)*(d−2)/2, wherein the one-vs-one classifier is configured to determine a state of the quantum qudit based on the output of the weighted integration units and the pairwise difference units.

Further, it is provided:

A multi-qudit multi-state discriminator, comprising a discriminator according to any of the preceding claims for each one of a plurality of qudits that are to be discriminated.

The multi-qudit multi-state discriminator may be seen as a set of multi-state discriminators that each extract single qudit-relevant information from a frequency-multiplexed multi-qudit readout signal and determine its state. The multi-qudit multi-state discriminator, consequently, comprises a number of weighted integration units that isolate the relevant qudit information from the multiplexed signal, wherein the number of weighted integration units is equal to (d−1), coupled to a one-vs-one classifier to discriminate the specific qudit state out of d states, and a number of (d−1)*(d−2)/2 pairwise difference units that in addition couple the one-vs-one classifier with the output of the weighted integration units.

Further, it is provided

A method for discriminating quantum qudits, the method comprising receiving an input signal that is read out from at least one quantum qudit that comprises a number d of states, performing weighted integrations on the input signal, wherein the number of weighted integrations is equal to (d−1), calculating pairwise differences for the results of the weighted integrations, wherein the number of pairwise differences is (d−1)*(d−2)/2, and determining a state of the quantum qudit based on the results of the weighted integrations and the results of the pairwise difference calculations with a one-vs-one classifier.

The present disclosure is based on the finding that modern quantum computer systems may feature qudits with more than two states.

In superconducting qudits that may feature many quantized energy levels for example, the lowest two energy levels may be used as computational states |0> and |1>. A third energy level, henceforth denoted as |2>, may be used as an ancilla state to implement two-qubit gate operations, such as the controlled Z-operation (CZ) or needs to be reset to |0> because of unwanted leakage from the computational states. Three-level systems, like described above, may be referred to as "qutrit".

The tune-up of such qutrit-based two-qubit gates requires reliably distinguishing between the |0>, |1>, and |2> states for characterization and optimization of the gate fidelity.

To this end, the present disclosure provides the method and the discriminator that allow reliably and quickly determining the current state of a multi-state qudit.

The discriminator comprises a signal interface that receives an input signal. The input signal may be provided as an IQ-signal that results from a measurement of the at least one qudit. Of course, other representations of the input signal than an IQ signal are also possible. The input signal may contain information that is read out from multiple qudits, not only from one qudit. Typically, each qudit is read out on a different frequency, the readouts from different qudits may then be frequency multiplexed in the input signal. Of course, in embodiments, the input signal may comprise information from only one qudit.

The input signal may also be seen as a signal that results from a quantum processor that carries the quantum qudits, and contains the state information of a specific number of qudits.

The input signal is then provided to the weighted integration units. The number of weighted integration units depends on the number d of states to be discriminated and is equal to (d−1). As the name already implies, the weighted integration units perform a weighted integration of the input signal and provide a respective integration result. The integration results are then provided to a one-vs-one classifier to distinguish between the d qudit states.

The one-vs-one classifier for d states needs d*(d−1)/2 inputs. In addition to the d−1 integration results, a number of pairwise difference units are provided that calculate the missing inputs as differences of pairs of results provided by the weighted integration units. A difference is calculated for every possible permutation of pairs of results.

In summary, a qudit discriminator needs d−1 integration weights, (d−1)(d−2)/2 pairwise difference units and a one-vs-one classifier with d(d−1)/2 inputs.

For a qubit with only two states, one weighted integration unit and no pairwise difference units are provided. The only weighted integration unit output is directly provided to the one-vs-one classifier.

Starting from a qutrit with three states, d=3, multiple weighted integration units and a number of pairwise difference units are further provided. The number of weighted integration units is equal to (d−1). In the case of a qutrit two weighted integration units are provided. The number of pairwise difference units is equal to (d−1)*(d−2)/2. In the case of d=3, one pairwise difference unit is provided.

The outputs of the pairwise difference units, in the case of a qutrit only one, are also provided to the one-vs-one classifier.

In the case of a qutrit for example, the outputs of the two weighted integration units are each coupled directly to the one-vs-one classifier. In addition, the two inputs of one pairwise difference unit are each coupled to one of the weighted integration units and the output of the pairwise difference unit is also coupled to the one-vs-one classifier. The one-vs-one classifier then determines the state of the respective qudit.

In the discriminator according to the present disclosure, the pairwise difference units enable reliably discriminating more than two states of a qudit. It is understood, that instead of the pairwise difference units more weighted integration units could be used. However, using more weighted integration units would introduce a lot of redundant information. Further, the ability to process the qutrits in real-time with readily available hardware, like FPGAs, would require much more resources. In contrast, the difference units according to the present disclosure are fast in execution, have low latency in signal processing and require minimal FPGA resources. The term "real-time" refers to the discrimination result being available quickly enough to act back on the quantum computer system in time, typically well within the coherence time.

The output of a discriminator as provided by the present disclosure may be forwarded for example to a digital output, allowing the results to be further used for feedback applications in the quantum computer system.

The latency from the input to the output of the discriminator is deterministic, which is crucial for the exact timing of state-dependent feedback actions. One example of such a feedback action is to increase state preparation fidelity by active reset (fast feedback) when qudit states or states of single qubits making up the qudit leaked to higher energy levels. In addition, being able to faithfully reset ancilla states higher or equal d=3 during an error correction code, such as a repetition or surface code is a crucial error mitigation technique, as these error correction codes cannot detect these higher states.

The elements of the discriminator according to the present disclosure i.e., the signal interface, the multi-state discriminator with the weighted integration units, the pairwise difference units and the one-vs-one classifier may be implemented as a dedicated processing element or multiple dedicated processing elements e.g., a processing unit, a microcontroller, a field programmable gate array, FPGA, a complex programmable logic device, CPLD, or the like.

Especially, when implementing the discriminator in a programmable logic device, it is important to reduce the amount of logic gates needed to a minimum, such that the discriminator may be efficiently implemented.

By using simple pairwise difference units in the discriminator as compared to implementing more weighted integration units, the present disclosure drastically reduces the amount of logic gates required to implement the discriminator. At the same time a deterministic behavior of the discriminator with known latencies is provided.

With the discriminator of the present disclosure, simultaneous fast, real-time, multiplexed readout of qudits with a configurable number of states is possible.

Summing up, the discriminator and method according to the present disclosure work in real-time with a deterministic latency, outputting digital multi-states directly without complex and lengthy post-measurement data analysis and thus allows to use the state information to directly drive feedback actuators.

Further embodiments of the present disclosure are subject of the further dependent claims and of the following description, referring to the drawings.

In an embodiment, the weighted integration units may each be configured to calculate a scalar product of a section or window of the input signal of a predetermined length and a weight vector of a predetermined length, wherein a dedicated weight vector may be provided for each one of the weighted integration units. The weight vectors may comprise complex values or be complex weight vectors, wherein it is understood that real values are a special case of complex values.

The input signal may be represented by complex samples $x_i$, and the weight vectors may each comprise a complex weight vector $w^{(j)}$ of length L, wherein j is the index of the weight vector and the respective weighted integration unit. The length L may be determined by the user. Typically, the user aims for fast readout, while at the same time the window needs to be long enough such that the random noise can be filtered out sufficiently. It is understood, that the length of the window may for example be iteratively determined by the user.

The weighted integration units each calculate the scalar product and obtain the scalar result R^{(j)}(x)=\Re [\sum_{i=0}^{L−1}(w^{(j)}_i x_i)] (LaTeX notation) or $$R^{(j)}(x) = \mathrm{Re}\left[\left[\sum_{i=0}^{L-1}\left(w_i^{(j)} * x_i\right)\right]\right],$$

where x is a vector of input samples also of length L, $w^{(j)}$ is the respective weight vector for index j, and the sum is calculated from i=0 to i=L−1, and wherein Re refers to the real part of a complex number.

In the described embodiment, the input samples are complex, with the real part corresponding to the in-phase and the imaginary part corresponding to the quadrature part. Real-valued signals are a special case of complex signals, where the imaginary part is 0, thus the present disclosure may also be applied to real signals.

In an embodiment, the weight vector may be obtained by measuring reference input traces, denoted as $x_{avg}^{(j)}$, where the quantum qudit has been prepared in a state |j>, and where the input has been averaged over a large number of repetitions in order to remove noise components of the input.

Then d−1 weight vectors may be chosen to correspond to the complex conjugate of a difference between the reference traces for state |j> and a state |k>, such that a linear-independent set of size d−1 is created. As an example, it's a possibility to choose k=0, i.e. the state |0> as a reference trace. In this case the weight vector may then be described as $w^{(j,0)}=(x_{avg}^{(j)}-x_{avg}^{(0)})^*$, where the index j is in the range from 1 to d−1. It is noted that other choices of differences are possible, as long as they are linearly independent, in specific states other than k=0 of the qudit can be chosen. It is noted that other choices of pairwise differences for the integrations weights would require either summations or a combination of summations and differences after weighted integration. All of these choices lead to equivalent results and performance of the multistate discriminator.

Due to the averaged nature of the reference traces, the resulting weight vectors allow to optimally discriminate the state |0> to each of the other d−1 states under the assumption of state-independent noise.

Using the pairwise difference units, the difference D between results for all pairwise combinations (k, l) of different results (k≠l) of the weighted integration units is calculated, $D^{(k,l)}(x)=R^{(k)}(x)-R^{(l)}(x)$, where l≠0.

This results in (d−1)*(d−2)/2 results in addition to the results from the weighted integration units. Together with the d−1 results from the weighted integration units, $R^{(j,0)}(x)=$ \Re[\sum_{i=0}^{L−1}($w^{(j,0)}{}_i x_i$)] (LaTeX notation) or $$R^{(j,0)}(x)=\mathrm{Re}\left[\left[\sum_{i=0}^{L-1}\left(w_i^{(j,0)}*x_i\right)\right]\right],$$

d*(d−1)/2 different values are obtained for further processing.

Due to the linearity of the weighted integration, these outcomes correspond to $D^{(k,l)}(x)=$\Re[\sum_{i=0}^{L−1} (($x_{avg,i}{}^{(k)}-x_{avg,i}{}^{(l)}$)*$x_i$)] (LaTeX notation) or $$D^{(k,l)}(x)=\mathrm{Re}\left[\left[\sum_{i=0}^{L-1}\left(\left(x_{avg,i}^{(k)}-x_{avg,i}^{(l)}\right)^{*}*x_i\right)\right]\right]$$

for all pairs of states |k> and |l>.

This fact allows to use only d−1 instead of d*(d−1)/2 weighted integration units for a one-vs-one classification of all d states of the quantum qudit.

In another embodiment, the one-vs-one classifier may comprise a number of threshold units, wherein the number of threshold units is d*(d−1)/2, and for each one of the weighted integration units one of the threshold units may be coupled directly to the respective one of the weighted integration units. The pairwise difference units may be arranged between the weighted integration units and the threshold units that are not directly coupled to the weighted integration units.

In yet another embodiment, the one-vs-one classifier may further comprise an assignment look-up table that is coupled to the outputs of the threshold units and that is configured to output the state of the quantum qudit based on the outputs of the threshold units. The assignment look-up table specifies the assigned qudit state for each combination of results provided by the binary threshold results. Optionally, the output of the assignment look-up table could also indicate an "unknown" state for certain combinations of inputs.

In another embodiment, each one of the pairwise difference units may comprise two inputs, wherein the two inputs of each one of the pairwise difference units may be coupled to different outputs of the weighted integration units, such that a difference is calculated for all possible permutations of the outputs of the weighted integration units.

The integration results from the weighted integration units may be provided directly or indirectly to a number of threshold units. The number of threshold units is equal to d(d−1)/2. Therefore, for every one of the weighted integration units one threshold unit is provided that is directly coupled to the respective weighted integration unit, and for every one of the pairwise difference units one threshold unit is provided that is coupled to the respective pairwise difference unit, and therefore indirectly to two of the weighted integration units.

In the case of a qutrit for example, the outputs of the two weighted integration units are each coupled directly to one of the threshold units. In addition, the two inputs of one pairwise difference unit are each coupled to one of the weighted integration units and the output of the pairwise difference unit is coupled to a third threshold unit.

By applying a threshold value $T^{(j)}$ to the results $R^{(j)}(x_i)$, a linear support vector machine with binary output is implemented. The presented solution is applicable for any machine learning approach that implements real-time classification of one or more sets of d-valued classifiers, where only d−1 classifiers are linearly independent. In embodiments, a linear support vector machine with a specific choice of weights based on differences of measured reference traces may be provided. As indicated, other training methods may also be used to obtain another set of weights. The discriminator and method according to the present disclosure do not require additional signal processing to implement non-orthogonal thresholds, and thus provides optimal readout fidelity at low latency and resource usage.

The thresholds for the threshold units directly coupled to the weighted integration units are calculated the same way as those using the differences between weighted integration results.

In the specifically discussed example here: the weight vectors are chosen as differences between particular states j and k that are linearly independent, for example between a reference state 0 and the (d−1) other states j:

$$W^{(j)}=(x_{avg}(j)-x_{avg}(0))^{*}$$

The weighted integration results are defined as:

$$R^{(j)}(x)=\backslash\mathrm{Re}\left[\backslash\mathrm{sum\_}\{i=0\}\hat{}\{L-1\}\left(w_i^{(j)}x_i\right)\right]=\backslash$$
$$\mathrm{Re}\left[\backslash\mathrm{sum\_}\{i=0\}\hat{}\{L-1\}\left(\left(x_{avg,i}{}^{(k)}-x_{avg,i}{}^{(0)}\right)^{*}x_i\right)\right](\mathit{LaTeX}\text{ notation) or}$$
$$R^{(j)}(x)=\mathrm{Re}\left[\left[\sum_{i=0}^{L-1}\left(w_i^{(j)}*x_i\right)\right]\right]=\mathrm{Re}\left[\left[\sum_{i=0}^{L-1}\left(\left(x_{avg,i}^{(k)}-x_{avg,i}^{(0)}\right)^{*}*x_i\right)\right]\right]$$

The differences are defined as:

$$D^{(k,l)}(x)=\backslash\mathrm{Re}\left[\backslash\mathrm{sum\_}\{i=0\}\hat{}\{L-1\}\left(\left(x_{avg,i}{}^{(k)}-x_{avg,i}{}^{(1)}\right)^{*}x_i\right)\right]$$
$$(\mathit{LaTeX}\text{ notation) or }D^{(k,l)}(x)=\mathrm{Re}\left[\left[\sum_{i=0}^{L-1}\left(\left(x_{avg,i}{}^{(k)}-x_{avg,i}{}^{(l)}\right)^{*}*x_i\right)\right]\right]$$

Therefore:

$$D^{(k,0)}(x)=\backslash\mathrm{Re}\left[\backslash\mathrm{sum\_}\{i=0\}\hat{}\{L-1\}\left(\left(x_{avg,i}{}^{(k)}-x_{avg,i}{}^{(0)}\right)^{*}x_i\right)\right]=\backslash$$
$$\mathrm{Re}\left[\backslash\mathrm{sum\_}\{i=0\}\hat{}\{L-1\}\left(w^{(k)}x_i\right)\right]=R^{(k)}(x)\ (\mathit{LaTeX}\text{ notation) or }D^{(k,0)}(x)=$$
$$\mathrm{Re}\left[\left[\sum_{i=0}^{L-1}\left(x_{avg,i}{}^{(k)}-x_{avg,i}{}^{(0)}\right)^{*}*x_i\right)\right]=\mathrm{Re}\left[\left[\sum_{i=0}^{L-1}\left(w^{(k)}*x_i\right)\right]\right]$$

Exemplary differences would be calculated as:

$$D^{(1,0)}=R^{(1)}$$
$$D^{(2,0)}=R^{(2)}$$
$$D^{(1,2)}=R^{(1)}-R^{(2)}$$

Thus the same formula to obtain the optimal threshold value can be used to configure the threshold units that are directly coupled to the integration units:

$$T^{(k,0)} = \left[D^{(k,0)}\left(x_{avg}^{(k)}\right) + D^{(k,0)}\left(x_{avg}^{(0)}\right)\right]/2 = \left[R^{(k)}\left(x_{avg}^{(k)}\right) + \left(x_{avg}^{(0)}\right)\right]/2$$

Under the assumption of state-independent noise, the optimal threshold $T^{(k,l)}$ for the single threshold units corresponds to the arithmetic mean of the outcomes $D^{(k,l)}$ given the reference inputs $x_{avg}^{(k)}$ and $x_{avg}^{(l)}$ i.e., $T^{(k,l)}=[D^{(k,l)}(x_{avg}^{(k)}+D^{(k,l)}(x_{avg}^{(l)})]/2$.

The present disclosure, however, is not limited to the particular technique on how this threshold is determined. Specifically, more complex noise-models may lead to other ways to determine the optimal threshold for the problem. Key here is that the thresholds discriminate the states faithfully. More complex noise models may for example be frequency-dependent or state-dependent noise models. Such models would lead to different distributions of integration results for each state. This means that the optimal threshold is not necessarily centered between the expected outcomes for the states k and l.

Applying this threshold to the result of the weighted integration units and the difference units yields d*(d−1)/2 binary values, which are $B^{(k,l)}=0$ if $D^{(k,l)}(x)\leq T^{(k,l)}$ or $B^{(k,l)}=1$ if $D^{(k,l)}(x)>T^{(k,l)}$.

The binary values provided by the threshold units serve as inputs for the assignment look-up table. The assignment look-up table maps the d*(d−1)/2 binary outcomes from the threshold units to the expected state |j> by storing the expected state for all 2d*(d−1)/2 possible binary inputs.

It is understood, that the output provided by the assignment look-up table denoted the most likely state that the quantum qudit was in, when the measurement was performed.

The correct mapping for the assignment look-up table may for example be identified by applying the above steps to the reference traces $x_{avg}^{(j)}$.

In a further embodiment, the input signal may comprise phase- and time-dependent amplitude and frequency information.

As indicated above, the input signal may be provided in the form of an IQ signal. However, any other type of signal is also possible that comprises the information required to determine the states of the respective qudits.

In another embodiment, the input signal may comprise multiple phase- and time-dependent amplitude and frequency information carrying signals that are frequency multiplexed.

The input signal may comprise multiple frequency-multiplexed signals. Each one of the signals may be provided at a distinct frequency for each qudit or qudit state.

In this embodiment, when processing the input signal, each one of the weighted integration units receives the same frequency-multiplexed signal. The choice of integration weights is in such an embodiment sufficient to filter out the relevant information required to discriminate between the states of a qudit.

In another embodiment of the multi-qudit multi-state discriminator, the multi-qudit multi-state discriminator may be configured in a programmable logic device that comprises a predetermined number N of weighted integration units, wherein the multi-qudit multi-state discriminator may be configured to discriminate any combination of M qubits, K qutrits, and L ququads, wherein M+2*K+3*L is lower or equal to N.

The presented method and multi-qudit multi-state discriminator need d−1 weighted integration units per qudit.

Therefore, N/(d−1) qudits may be discriminated given a number N of available weighted integration units.

The weighted integration units are the only unit in the signal processing chain that require multipliers and on-chip memory, which are typically the limiting factor in terms of FPGA resources or resources in other programmable logic device.

In embodiments, in order to make the number of qudits and number of states d for each qudit configurable, the same number of assignment matrices as weighted integration units may be provided. In this manner it is ensured that it is always possible to process the maximum possible number of qudits for the given number of Weighted Integration Units.

Of course, enough pairwise difference units and threshold units may be provided to implement multiple copies of the sub-circuits or discriminators for qubits (d=2), qutrits (d=3), and ququads (d=4). Since the weighted integration units are the limiting units that require the most resources in a programmable logic device, the number of pairwise difference units and threshold units may easily be provided as required.

When implemented for example, in an FPGA, a reduction of the total amount of needed real-time signal processing resources may be obtained by realizing that not every assignment look-up table and difference unit needs to be capable of processing the maximum number of d_max states, because if one qudit requires d−1 of weighted integration units then these cannot be simultaneously used by any of the other qudits. It is, therefore, possible to generate the pairwise difference units, threshold units, and assignment look-up tables programmatically, iterating over an index j from 0 to N−1. For each index j, the highest number of states d within the range 2 to d_max for which d−1 divides j and for which j+d−1≤N may be selected.

Then the necessary pairwise difference units and threshold units may be generated for d-state discrimination of qubit j and the number of inputs of the corresponding assignment look-up table j may be extended to d*(d−1)/2.

A greedy algorithm may then assign the requested number of qudits in decreasing order of the number of states d to the corresponding d-state capable assignment matrices. This reduction of processing resources allows discrimination of the same combinations of qudits as a non-optimized implementation but with less logic gates consumed in the FPGA.

In an exemplary implementation with N=16 and d_max=4 this optimization means that only 18 pairwise difference units are required instead of 29. Furthermore, regarding the assignment look-up tables instead of 16 4-state capable ones, after optimization only 5 4-state capable ones, 5 3-state capable ones, and 6 2-state capable ones are required.

The structure of a multi-qudit multi-state discriminator according to the present disclosure may be optimized further to only use 3 3-state capable assignment look-up tables. In such an embodiment, the sum of 4-state & 3-state capable assignment matrices is 8, the same as the maximum number of 3-state discriminations that can be done for 16 integration units. With this further optimization extra multiplexers are required to select which threshold results go to certain 4-state capable assignment matrices. Without this additional optimization, the connections between threshold units and assignment matrices are fixed. This optimization does not influence the required number of pairwise difference units.

BRIEF DESCRIPTION OF THE DRAWINGS

For a more complete understanding of the present disclosure and advantages thereof, reference is now made to the following description taken in conjunction with the accompanying drawings. The disclosure is explained in more detail below using exemplary embodiments which are specified in the schematic figures of the drawings, in which.

In the figures like reference signs denote like elements unless stated otherwise.

DETAILED DESCRIPTION OF THE DRAWINGS

Figure 1:
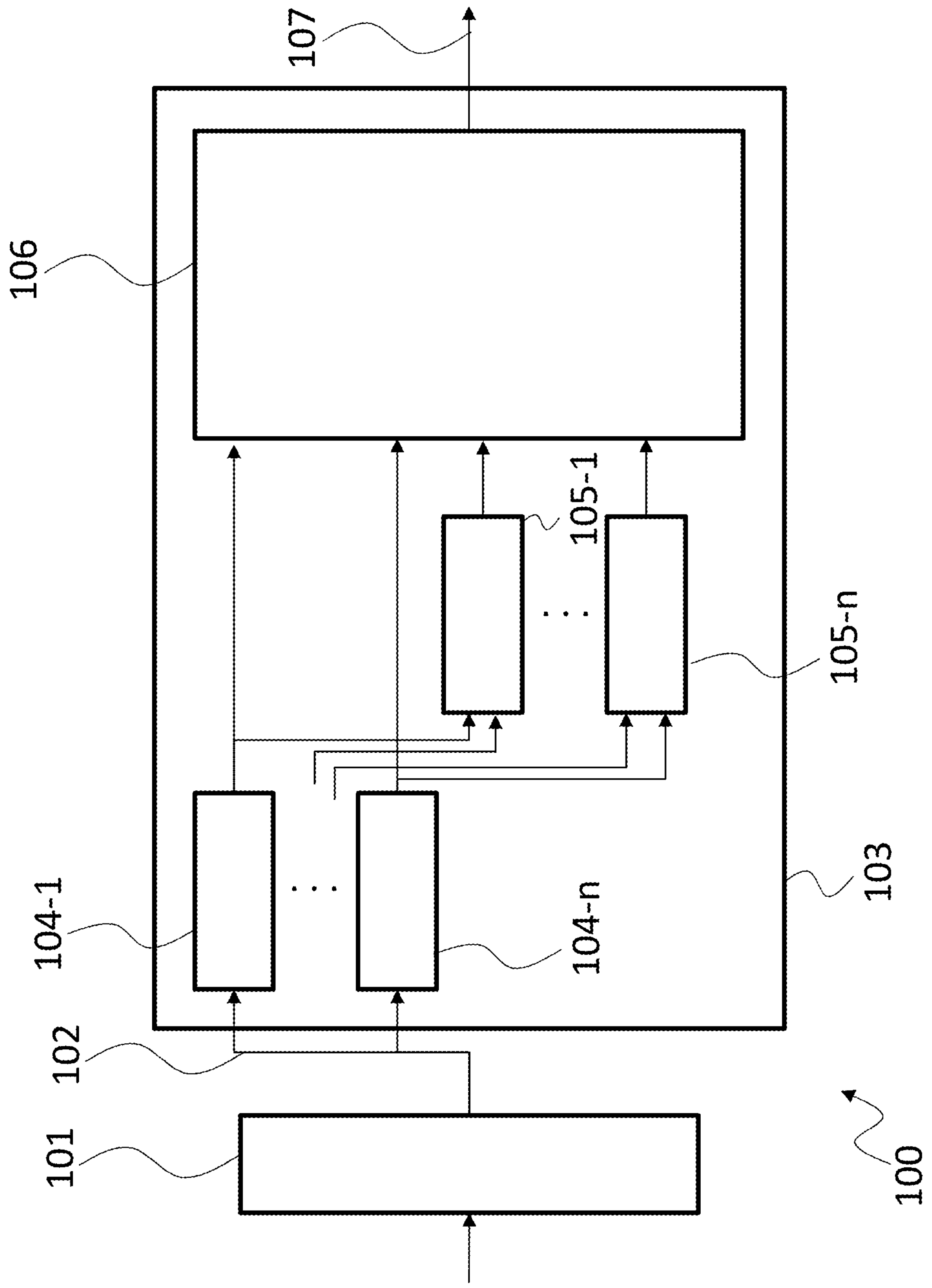
FIG. 1 shows a block diagram of an embodiment of a discriminator according to the present disclosure.

FIG. 1 shows a block diagram of a discriminator 100. The discriminator 100 comprises a signal interface 101 that receives an input signal 102 and provides the input signal 102 to a multi-state discriminator 103 that determines a state 107 of a quantum qudit, from which the input signal 102 is read out. It is understood, that the input signal 102 may comprise a frequency multiplexed signal that comprises information that is read out from multiple qudits. In such an embodiment, the discriminator 100 determines the state 107 of one of the respective qudits. To determine the states of multiple qudits, multiple discriminators 100 may be provided, as is shown for the multi-qudit multi-state discriminator in FIG. 3.

The multi-state discriminator 103 comprises a number of weighted integration units **104-1-104-*n*, a one-vs-one classifier 106 and a number of pairwise difference units 105-1-105-*n*. The one-vs-one classifier 106 is coupled to each one of the weighted integration units 104-1-104-*n* and the pairwise difference units 105-1-105-*n* and determines the state 107 based on the results provided by the weighted integration units 104-1-104-*n* and the pairwise difference units 105-1-105-*n***.

The number of weighted integration units **104-1-104-*n* is chosen to be equal to (d−1), wherein d is the number of states that the quantum qudit comprises. The number of pairwise difference units 105-1-105-*n*** is chosen to be (d−1)*(d−2)/2;

Each one of the weighted integration units **104-1-104-*n* calculates a scalar product of a section or windows of the input signal 102** with a predetermined length L and a dedicated weight vector of the same length.

The pairwise difference units **105-1-105-*n* are arranged such that a difference is calculated for all possible combinations or permutations of the results provided by the weighted integration units 104-1-104-*n***.

Figure 2:
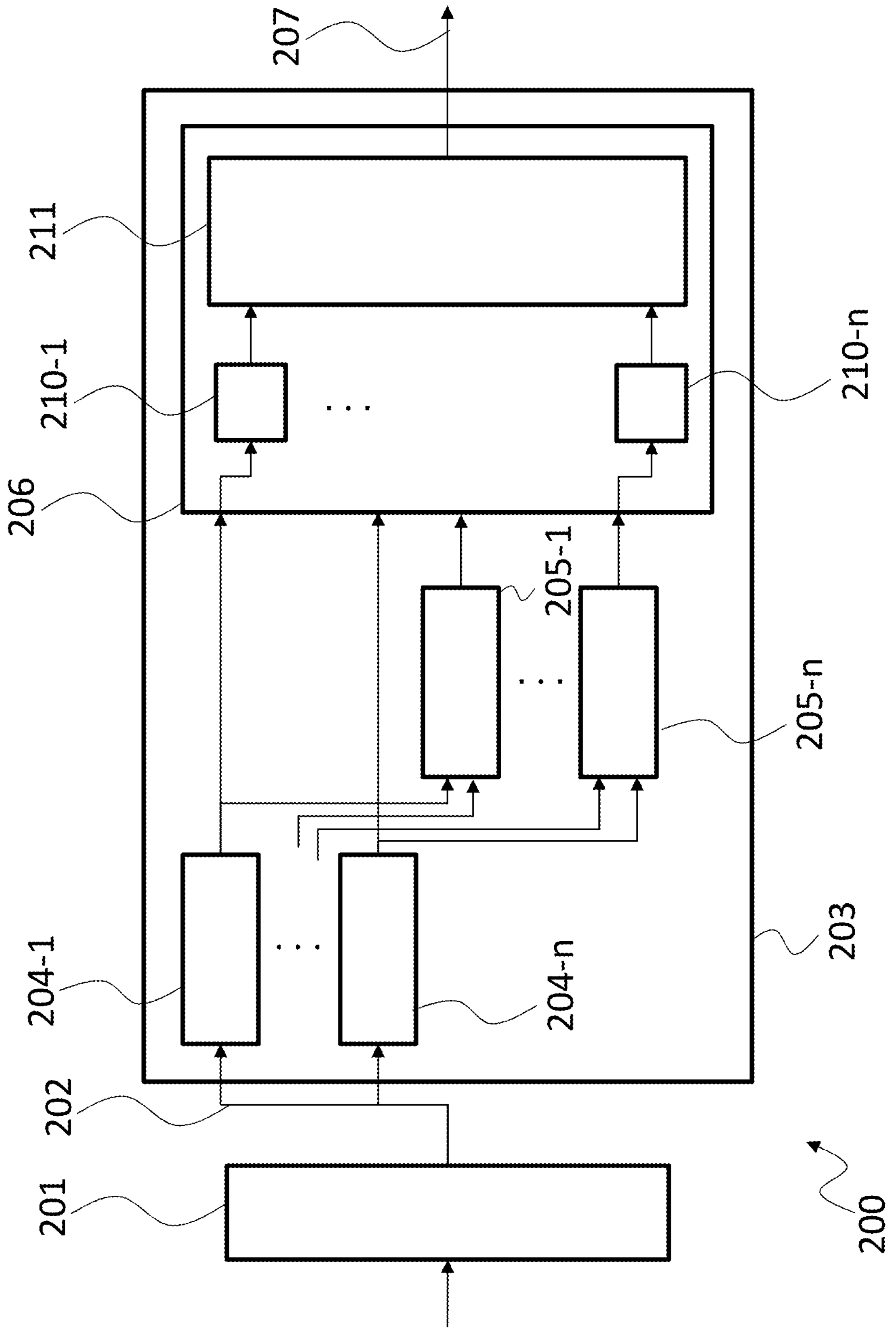
FIG. 2 shows a block diagram of another embodiment of a discriminator according to the present disclosure.

FIG. 2 shows a block diagram of another discriminator 200. The discriminator 200 is based on the discriminator 100 and comprises a signal interface 201 that receives an input signal 202 and provides the input signal 202 to a multi-state discriminator 203 that determines a state 207 of quantum qudit, from which the input signal 202 is read out. The explanations provided above regarding the input signal 102 apply mutatis mutandis to the input signal 202. The multi-state discriminator 203 comprises a number of weighted integration units **204-1-204-*n*, a one-vs-one classifier 206 and a number of pairwise difference units 205-1-205-*n***.

The one-vs-one classifier 206 is coupled to each one of the weighted integration units **204-1-204-*n* and the pairwise difference units 205-1-205-*n* and comprises a number of threshold units 210-1-210-*n*, and an assignment look-up table 211 that is coupled to the outputs of the threshold units 210-1-210-*n***

The number of threshold units **210-1-210-*n*** is equal to d*(d−1)/2 i.e., to the number of weighted integration units **204-1-204-*n* plus the number of pairwise difference units 205-1-205-*n***.

Each one of the weighted integration units **204-1-204-*n* is coupled to one of the threshold units 210-1-210-*n*, and each one of the pairwise difference units 205-1-205-*n* is coupled to one of the threshold units 210-1-210-*n*. The threshold units 210-1-210-*n*** convert the received values into a binary value i.e., a 0 if the received value is below or equal to the respective threshold value, and a 1 if the received value is above the respective threshold value.

The assignment look-up table 211 then outputs the state 207 of the quantum qudit based on the outputs of the threshold units **210-1-210-*n***.

Figure 3:
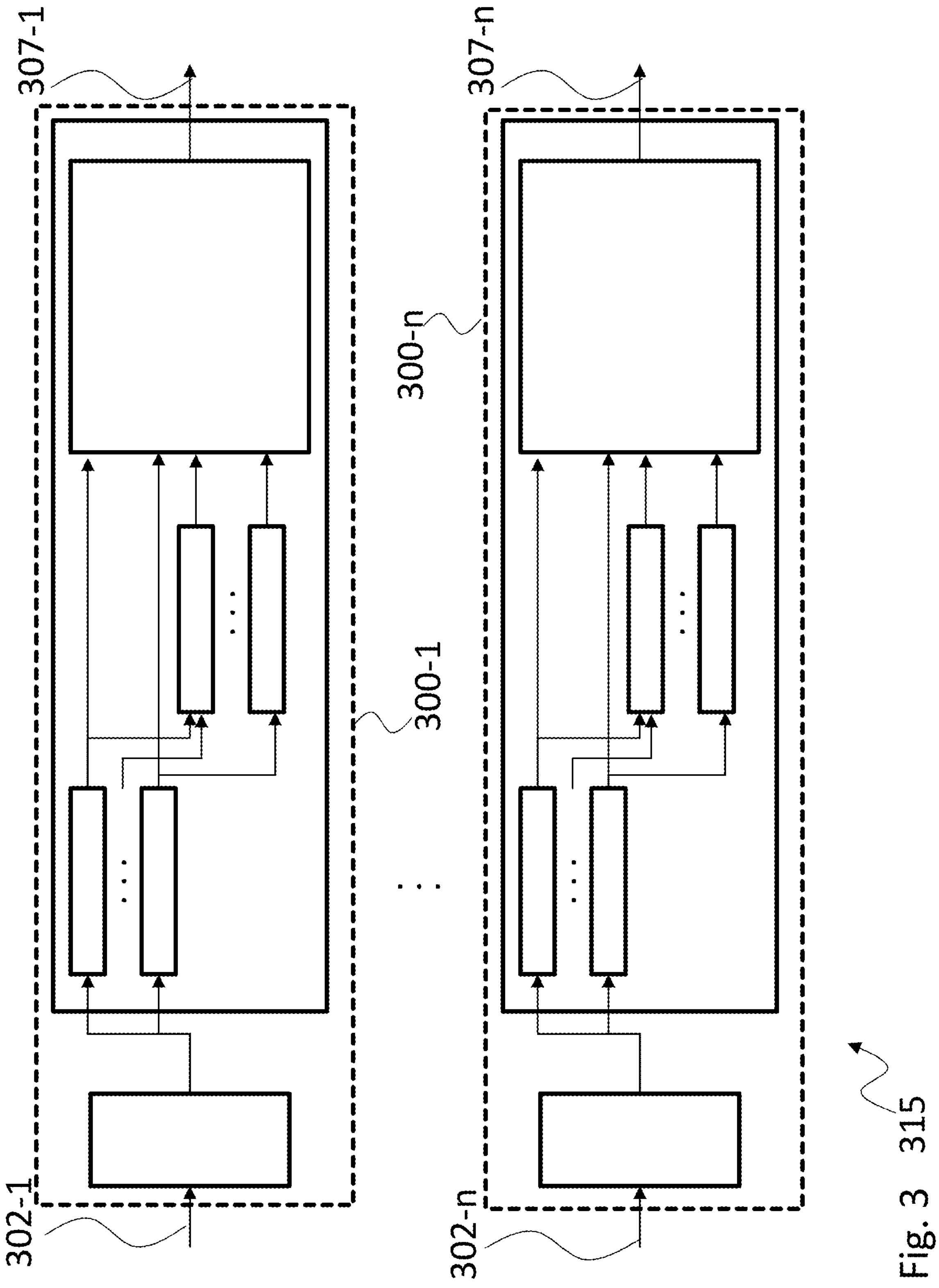
FIG. 3 shows a block diagram of an embodiment of a multi-qudit multi-state discriminator according to the present disclosure.

FIG. 3 shows a block diagram of a multi-qudit multi-state discriminator 315. The multi-qudit multi-state discriminator 315 may comprise any number of discriminators **300-1-300-*n* as shown for example, in FIGS. 1 and 2. Of course, the multi-qudit multi-state discriminator 315** may be provided with any embodiment of a discriminator as provided in this disclosure.

The single discriminators **300-1-300-*n* each receive an input signal 302-1-302-*n* that is measured at a respective qudit and output a respective state 307-1-307-*n*. It is understood, that the same or a single input signal may be provided to the discriminators 300-1-300-*n***, and that the single input signal may comprise frequency multiplexed signals that are based on the information read out from multiple qudits.

In an embodiment, the multi-qudit multi-state discriminator 315 may be provided in a programmable logic device, like an FPGA. In such an embodiment, the multi-qudit multi-state discriminator 315 may comprise a predetermined number N of weighted integration units.

The multi-qudit multi-state discriminator 315 is in such an embodiment capable of discriminating any combination of M qubits, K qutrits, and L ququads, wherein M+2*K+3*L is lower or equal to N. In such embodiments, multiple input signals **302-1-302-*n* may be present, wherein one of the input signals may be provided to the M discriminators 300-1-300-*n* that are capable of discriminating qubits, one of the input signals may be provided to the K discriminators 300-1-300-*n* that are capable of discriminating qutrits, and one of the input signals may be provided to the L discriminators 300-1-300-*n* that are capable of discriminating qubits. Each one of the input signals 302-1-302-*n*** may comprise frequency multiplexed input signals that are based on signals read out from the respective M qubits, K qutrits, and L ququads.

Figure 4:
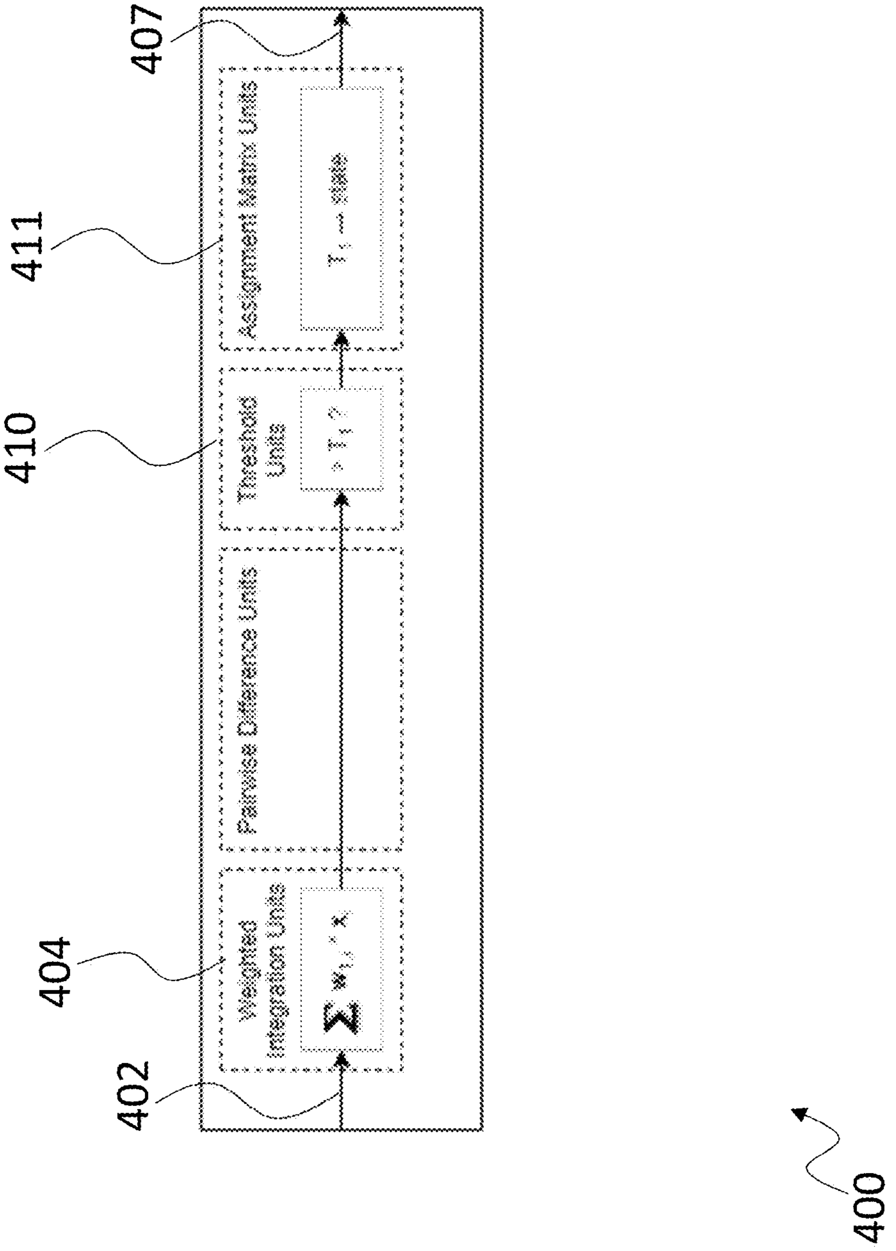
FIG. 4 shows a block diagram of another embodiment of a discriminator according to the present disclosure.

FIG. 4 shows a block diagram of another discriminator 400 for a two-state qudit i.e., a qubit.

The discriminator 400 comprises a weighted integration unit 404 that receives an input signal 402. The output of the weighted integration unit 404 is directly provided to a threshold unit 410 that provides a respective binary output to the assignment look-up table 411. The assignment look-up table 411 outputs the state 407 of the qubit The number of weighted integration units 404 is calculated to be (d−1)->(2−1)=1. The discriminator 400 does not comprise any pairwise difference unit, since with a two-state qudit, the number of pairwise difference units is calculated to be (d−1)*(d−2)/2->(2−1)*(2−2)/2=0. The number of threshold units 410 is calculated to be d*(d−1)/2->2*(2−1)/2=1.

Figure 5:
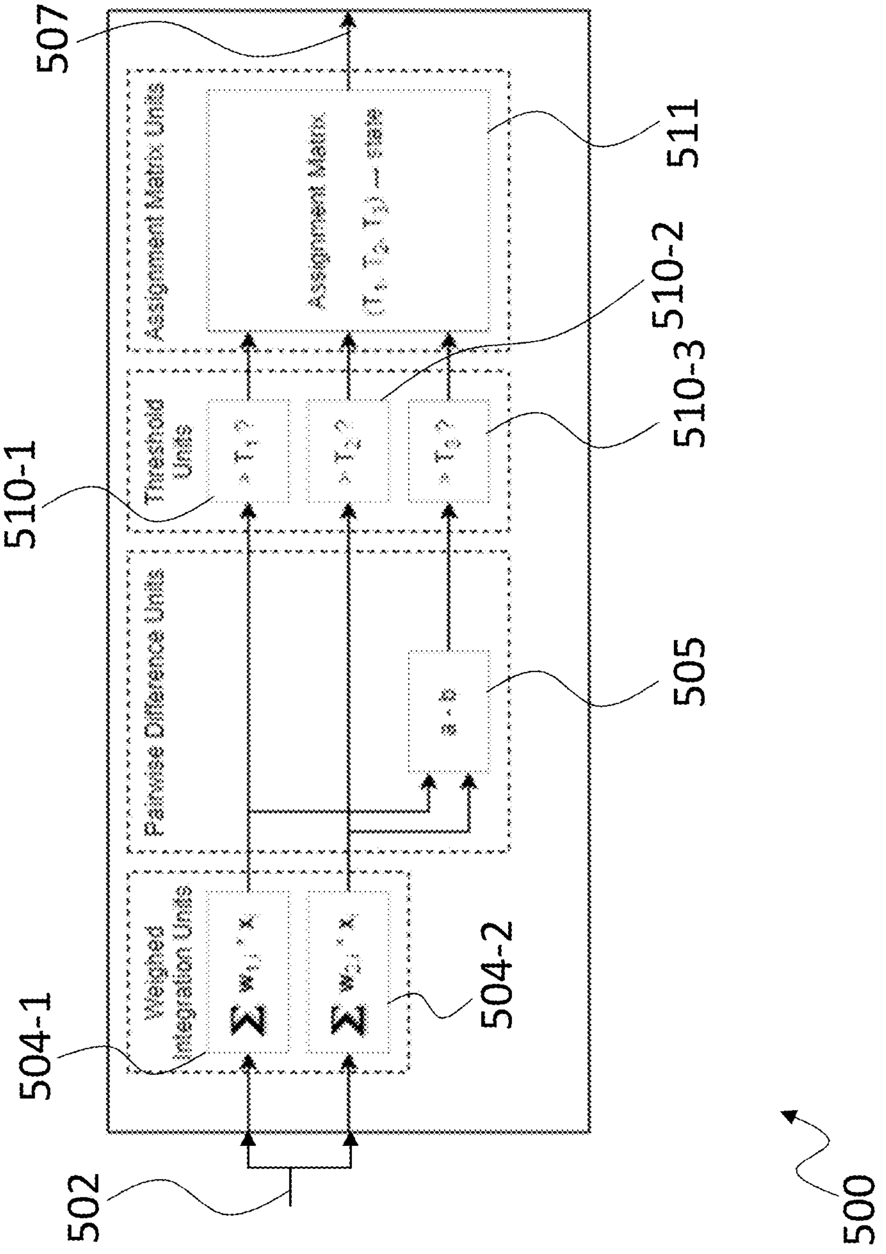
FIG. 5 shows a block diagram of another embodiment of a discriminator according to the present disclosure.

FIG. 5 shows a block diagram of another discriminator 500 for a three-state qudit i.e., for a qutrit.

The discriminator 500 is based on the discriminator 400. However, with a three-state qudit, the number of weighted integration units 504-1-504-2 is calculated to be (d-1)->(3−1)=2. The discriminator 500 comprise one pairwise difference unit 505, since with a three-state qudit, the number of pairwise difference units is calculated to be (d−1)*(d−2)/2->(3−1)*(3−2)/2=1. The number of threshold units 510-1-510-3 is calculated to be d*(d−1)/2->3*(3−1)/2=3.

The first weighted integration unit 504-1 is coupled to the first threshold unit 510-1 and a first input of the pairwise difference unit 505. The second weighted integration unit 504-2 is coupled to the second threshold unit 510-2 and a second input of the pairwise difference unit 505. The output of the pairwise difference unit 505 is coupled to the third threshold unit 510-3.

The outputs of the threshold units 510-1-510-3 are all provided to the assignment look-up table 511 to determine the state 507 of the qutrit.

Figure 6:
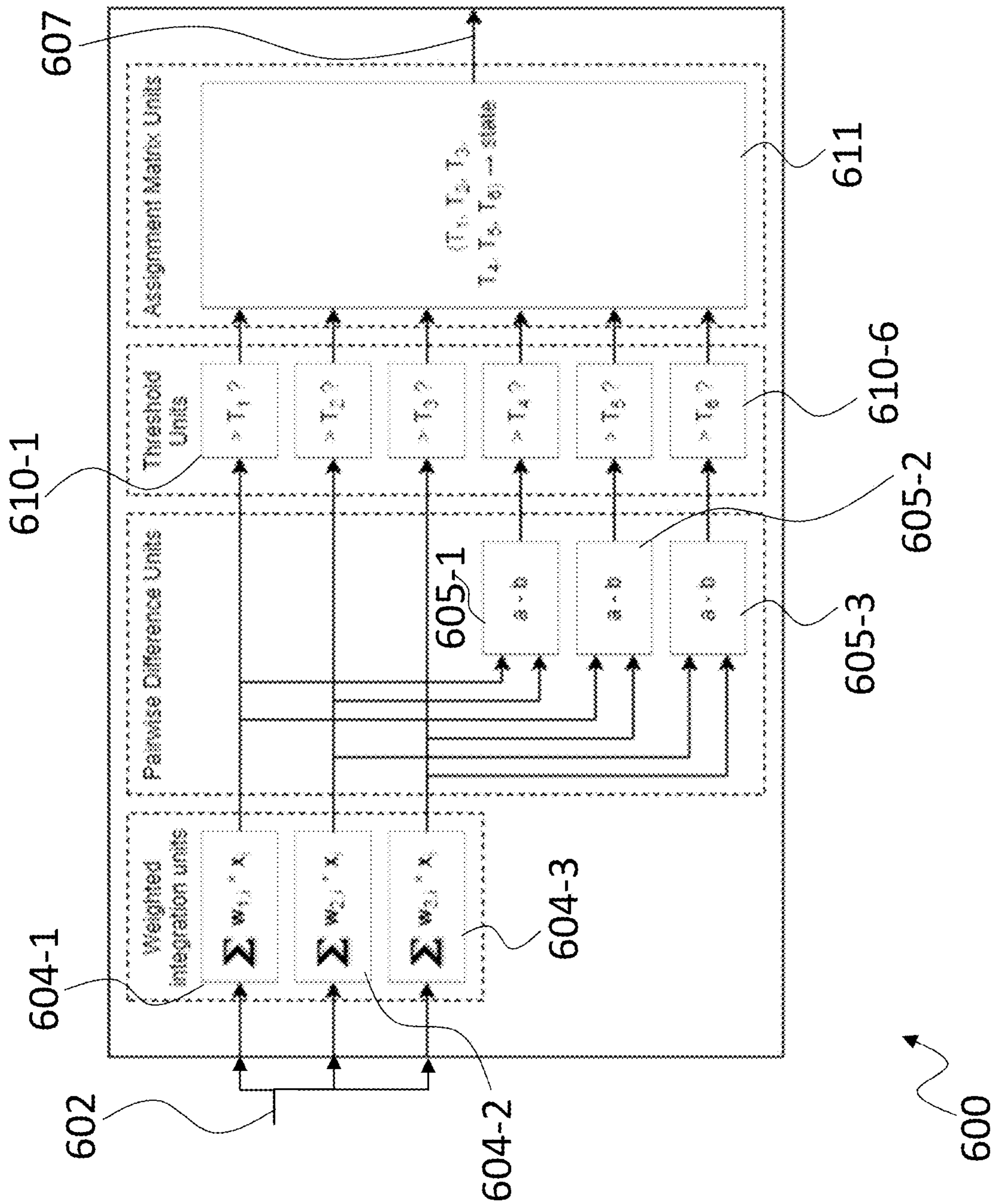
FIG. 6 shows a block diagram of another embodiment of a discriminator according to the present disclosure.

FIG. 6 shows a block diagram of another discriminator 600 for a four-state qudit i.e., a ququad.

The discriminator 600 is based on the discriminator 500. However, with a four-state qudit, the number of weighted integration units 604-1-604-3 is calculated to be (d−1)->(4−1)=3. The discriminator 600 comprise three pairwise difference units 605-1-605-3, since with a four-state qudit, the number of pairwise difference units is calculated to be (d−1)*(d−2)/2->(4−1)*(4−2)/2=3. The number of threshold units 610-1-610-6 is calculated to be d*(d−1)/2->4*(4−1)/2=6.

The first weighted integration unit 604-1 is coupled to the first threshold unit 610-1, a first input of the first pairwise difference unit 605-1, and a first input of the second pairwise difference unit 605-1. The second weighted integration unit 604-2 is coupled to the second threshold unit 610-2 (for the sake of clarity, only the first and the last threshold units are provided with a reference sign), a second input of the first pairwise difference unit 605-1, and a first input of the third pairwise difference unit 605-3. The third weighted integration unit 604-3 is coupled to the third threshold unit 610-3, a second input of the second pairwise difference unit 605-2, and a second input of the third pairwise difference unit 605-3.

The first pairwise difference unit 605-1 is coupled to the fourth threshold unit 610-4, the second pairwise difference unit 605-2 is coupled to the fifth threshold unit 610-5, and the third pairwise difference unit 605-3 is coupled to the sixth threshold unit 610-6.

The outputs of the threshold units 610-1-610-6 are all provided to the assignment look-up table 611 to determine the state 607 of the ququad.

For the sake of clarity in the following description of the method-based FIG. 7 the reference signs used above in the description of apparatus based FIGS. 1-6 will be maintained.

Figure 7:
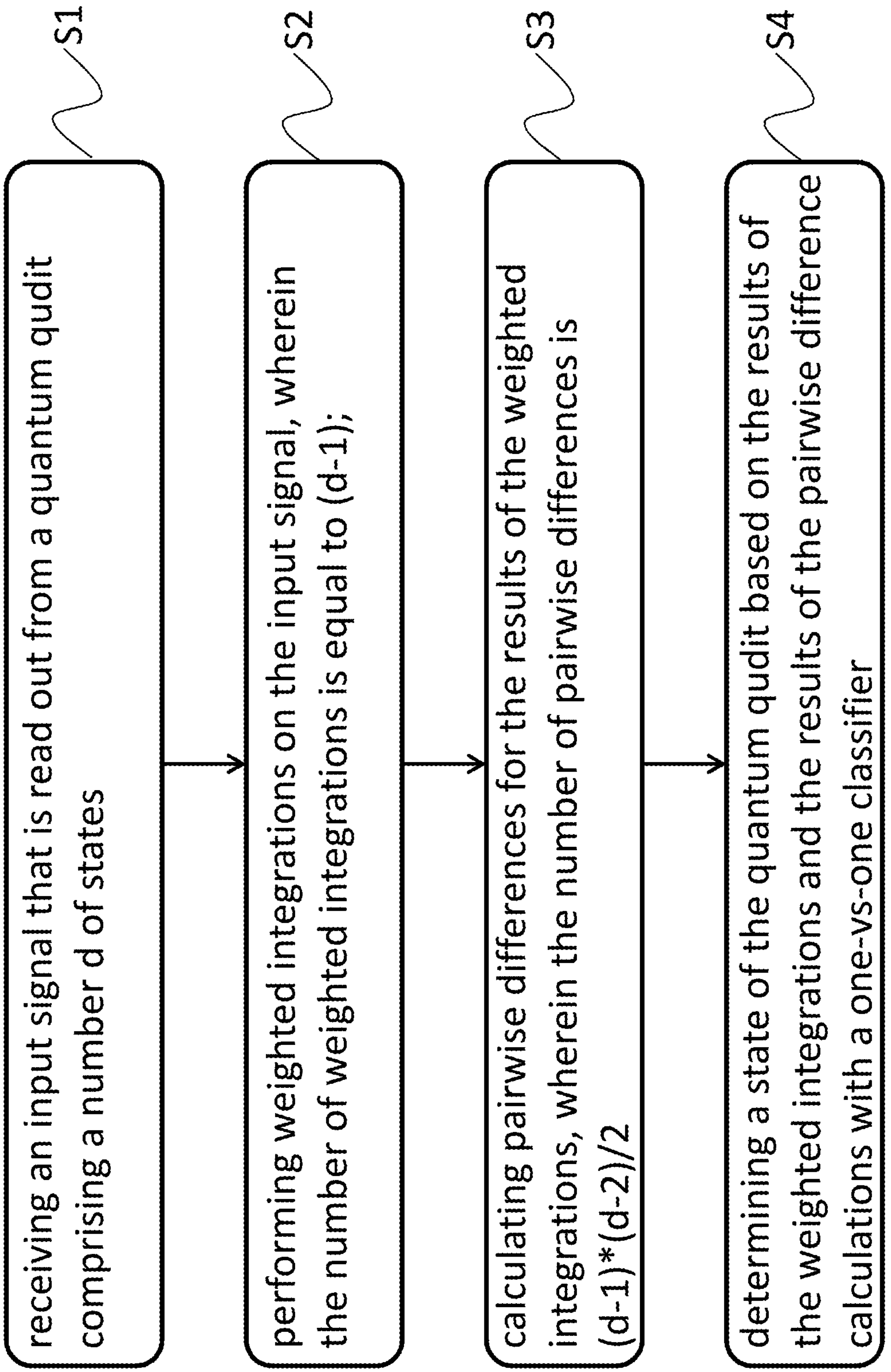
FIG. 7 shows a flow diagram of an embodiment of a method according to the present disclosure.

FIG. 7 shows a flow diagram of an embodiment of a method for discriminating quantum qudits.

The method comprises receiving S1 an input signal 102, 202, 302-1-302-*n*, 402, 502, 602 that is read out from a quantum qudit comprising a number d of states, and performing S2 weighted integrations on the input signal 102, 202, 302-1-302-*n*, 402, 502, 602, wherein the number of weighted integrations is equal to (d−1). The method, further, comprises calculating S3 pairwise differences for the results of the weighted integrations, wherein the number of pairwise differences is (d−1)*(d−2)/2, and determining S4 a state 107, 207, 307-1-307-*n*, 407, 507 of the quantum qudit based on the results of the weighted integrations and the results of the pairwise difference calculations with a one-vs-one classifier 106, 206.

The weighted integration may for example be performed by calculating a scalar product of a section of the input signal 102, 202, 302-1-302-*n*, 402, 502, 602 of a predetermined length and a weight vector of a predetermined length, wherein a dedicated weight vector is provided for each one of the weighted integrations that are performed.

The difference may be calculated for all possible pairwise permutations or combinations of the results of the weighted integrations.

The state 107, 207, 307-1-307-*n*, 407, 507 of the quantum qudit with the one-vs-one classifier 106, 206 may comprise converting the results of the weighted integrations and the results of the pairwise difference calculations into binary values by applying a respective threshold to each one of the results of the weighted integrations and the results of the pairwise difference calculations, and providing the binary values to an assignment look-up table 211, 411, 511, 611 that outputs the state 107, 207, 307-1-307-*n*, 407, 507 of the quantum qudit based on the binary values.

Although specific embodiments have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

LIST OF REFERENCE SIGNS

100, 200, 300-1-300-*n*, 400, 500, 600 discriminator
101, 201 signal interface
102, 202, 302-1-302-*n*, 402, 502, 602 input signal
103, 203 multi-state discriminator
104-1-104-*n*, 204-1-204-*n*, 404 weighted integration unit
504-1-504-2, 604-1-604-2 weighted integration unit
105-1-105-*n*, 205-1-205-*n* pairwise difference unit
505, 605-1-605-3 pairwise difference unit
106, 206 one-vs-one classifier
107, 207, 307-1-307-*n*, 407, 507 state indication
210-1-210-*n*, 410, 510-1-510-3 threshold unit
610-1-610-6 threshold unit
211, 411, 511, 611 assignment look-up table
315 multi-qudit multi-state discriminator

The invention claimed is:

1. A discriminator, comprising:

a signal interface configured to receive an input signal that is read out from at least one quantum qudit that comprises a number d of states that is greater than two; and a multi-state discriminator comprising:

a number of weighted integration units, wherein the number of weighted integration units is equal to (d-1);

a number of pairwise difference units , wherein the number of pairwise difference units is (d-1)*(d-2)/2, and wherein each one of the pairwise difference units comprises two inputs, wherein the two inputs of each one of the pairwise difference units are coupled to different ones of the weighted integration units such that a difference is calculated for all possible permutations of the outputs of the weighted integration units; and a one-vs-one classifier that is coupled to the weighted integration units and the pairwise difference units, wherein the one-vs-one classifier is configured to determine a state of the quantum qudit based on an output of the weighted integration units and the pairwise difference units.

2. The discriminator according to claim 1, wherein the weighted integration units are each configured to calculate a scalar product of a section of the input signal of a predetermined length and a complex weight vector of a predetermined length, wherein a dedicated weight vector is provided for each one of the weighted integration units.

3. The discriminator according to claim 1, wherein the one-vs-one classifier comprises:

a number of threshold units, wherein the number of threshold units is d*(d−1)/2, and wherein for each one of the weighted integration units, one of the threshold units is coupled directly to a respective one of the weighted integration units, and wherein the pairwise difference units are arranged between the weighted integration units and the threshold units that are not directly coupled to the weighted integration units.

4. The discriminator according to claim 3, wherein the one-vs-one classifier further comprises:

an assignment look-up table that is coupled to outputs of the threshold units and that is configured to output the state of the quantum qudit based on the outputs of the threshold units.

5. The discriminator according to claim 1, wherein the input signal comprises phase- and time-dependent amplitude and frequency information.

6. The discriminator according to claim 1, wherein the input signal comprises multiple phase- and time-dependent amplitude and frequency information carrying signals that are frequency multiplexed.

7. Multi-qudit multi-state discriminator, comprising:

a discriminator according to claim 1 for each one of a plurality of qudits that are to be discriminated.

8. The multi-qudit multi-state discriminator according to claim 7, wherein the multi-qudit multi-state discriminator is configured in a programmable logic device that comprises a predetermined number N of weighted integration units, wherein the multi-qudit multi-state discriminator is configured to discriminate any combination of M qubits, K qutrits, and L ququads, wherein M+2*K+3*L is lower than or equal to N.

9. The multi-qudit multi-state discriminator according to claim 7, wherein the weighted integration units in each of the discriminators are each configured to calculate a scalar product of a section of the input signal of a predetermined length and a complex weight vector of a predetermined length, wherein a dedicated weight vector is provided for each one of the weighted integration units.

10. The multi-qudit multi-state discriminator according to claim 7, wherein the one-vs-one classifier in each of the discriminators comprises:

a number of threshold units, wherein the number of threshold units is d*(d−1)/2, and wherein for each one of the weighted integration units one of the threshold units is coupled directly to a respective one of the weighted integration units, and wherein the pairwise difference units are arranged between the weighted integration units and the threshold units that are not directly coupled to the weighted integration units.

11. The multi-qudit multi-state discriminator according to claim 10, wherein the one-vs-one classifier in each of the discriminators further comprises:

an assignment look-up table that is coupled to outputs of the threshold units and that is configured to output the state of the quantum qudit based on the outputs of the threshold units.

12. The multi-qudit multi-state discriminator according to claim 10, wherein each one of the pairwise difference units in each of the discriminators comprises two inputs, wherein the two inputs of each one of the pairwise difference units are coupled to different ones of the weighted integration units, such that a difference is calculated for all possible permutations of outputs of the weighted integration units.

13. The multi-qudit multi-state discriminator according to claim 7, wherein the input signal for each of the discriminators comprises phase- and time-dependent amplitude and frequency information.

14. A method for discriminating quantum qudits, the method comprising:

receiving an input signal that is read out from at least one quantum qudit that comprises a number d of states that is greater than two;

performing weighted integrations on the input signal, wherein the number of weighted integrations is equal to (d−1);

calculating pairwise differences for results of the weighted integrations, wherein the number of pairwise differences is (d−1)*(d−2)/2, wherein a difference is calculated for all possible pairwise permutations of the results of the weighted integrations; and determining a state of the quantum qudit based on the results of the weighted integrations and results of the pairwise difference calculations with a one-vs-one classifier.

15. The method according to claim 14, wherein performing a weighted integration comprises calculating a scalar product of a section of the input signal of a predetermined length and a weight vector of a predetermined length, wherein a dedicated weight vector is provided for each one of the weighted integrations that are performed.

16. The method according to claim 14, wherein determining the state of the quantum qudit with the one-vs-one classifier comprises:

converting the results of the weighted integrations and the results of the pairwise difference calculations into binary values by applying a respective threshold to each one of the results of the weighted integrations and the results of the pairwise difference calculations; and providing the binary values to an assignment look-up table that outputs the state of the quantum qudit based on the binary values.

17. The method according to claim 14, wherein the input signal comprises phase- and time-dependent amplitude and frequency information.

18. The method according to claim 14, wherein the input signal comprises multiple phase- and time-dependent amplitude and frequency information carrying signals that are frequency multiplexed.

* * * * *